United States Patent [19]
Myers

[11] Patent Number: 5,456,793
[45] Date of Patent: Oct. 10, 1995

[54] MECHANISM FOR HEAT BONDING BANDS TO HUBS

[75] Inventor: John E. Myers, Sparks, Nev.

[73] Assignee: Torque Converter Rebuilding Systems, Inc., Sparks, Nev.

[21] Appl. No.: 95,957

[22] Filed: Jul. 22, 1993

[51] Int. Cl.⁶ .................................................... B30B 15/34
[52] U.S. Cl. ..................... 156/583.1; 100/92; 156/583.7; 156/583.91; 219/243; 269/47
[58] Field of Search ................................. 156/423, 583.1, 156/583.6, 583.7, 583.91, 215, 475, 580; 100/92, 93 PB, 291; 269/43, 47, 48.1, 203, 249, 52, 130–132; 29/469.5, 559, 402.09, 523, 894.38; 188/218 R; 219/243, 221, 535

[56] References Cited

U.S. PATENT DOCUMENTS

| | | | |
|---|---|---|---|
| 2,340,692 | 2/1944 | Ridd | 269/47 |
| 2,349,537 | 5/1944 | Carlsen | 269/52 |
| 2,364,150 | 12/1944 | Lowenstein | 269/203 |
| 2,503,055 | 4/1950 | Langford et al. | 100/93 PB |
| 2,646,378 | 7/1953 | Morin | 156/215 |
| 2,730,604 | 1/1956 | Eberle et al. | 269/48.1 |
| 2,750,912 | 6/1956 | King | 219/221 |
| 2,897,925 | 4/1959 | Strohm | 188/218 R |
| 3,022,209 | 2/1962 | Campbell | 285/423 |
| 3,178,952 | 4/1965 | Oles | 29/523 |
| 3,228,678 | 1/1966 | Koger | 156/423 |
| 3,773,312 | 11/1973 | Victorino | 269/50 |
| 4,400,969 | 8/1983 | Specktor | 269/203 |
| 4,969,972 | 11/1990 | Kunz | 156/304.2 |
| 5,266,137 | 11/1993 | Hollingsworth | 156/156 |

FOREIGN PATENT DOCUMENTS

| | | | |
|---|---|---|---|
| 1311987 | 11/1962 | France | 29/402.09 |
| 19438 | 11/1992 | WIPO | 156/244.15 |

*Primary Examiner*—Steven D. Maki
*Attorney, Agent, or Firm*—Bielen, Peterson & Lampe

[57] ABSTRACT

A mechanism for heat bonding a mastic coated opened band to a heat conductive hub which utilizes a mandrel sized to fit within the hub. The mandrel itself is formed of heat conductive material and includes cavities for carrying heating elements. The hub is mounted on a mandrel while the mastic coated band is held tightly to the external surface of the hub. Heating elements transfer heat to the mastic on the bands and permit the same to be fixed to the hub when cooled.

11 Claims, 4 Drawing Sheets

5,456,793

MECHANISM FOR HEAT BONDING BANDS TO HUBS

BACKGROUND OF THE INVENTION

The present invention relates to a novel mechanism for heat bonding a mastic coated open band to a heat conductive hub.

Automatic transmission hubs require the bonding of liners and connecting of metal bands to the same during repair procedures. It is important that such liner bonding be achieved accurately and efficiently to ensure the workability of the same in an automatic transmission apparatus.

In the past, band liners have been held to the drum manually and heated externally with a torch or other source of heat. Although successful in binding band liners to a metal drum, such a process is slow, requires a high degree of skill to achieve accuracy.

A mechanism for heat bonding a mastic coated open band to a heat conductive hub would be a notable advance in the automotive industry.

SUMMARY OF THE INVENTION

In accordance with the present invention, a novel and useful mechanism for heat bonding a mastic coated open band to a heat conductive hub or drum is herein provided.

The mechanism of the present invention utilizes a mandrel sized to fit within a hub receiving the band. The mandrel is formed of heat conductive material such as aluminum, steel, and the like. The mandrel is formed to conform with the internal cavity of the hub to which the band is being applied. First mounting means is employed to hold the hub on the mandrel such that it is in snug contact with the outer surface of the mandrel. First mounting means may take the form of a threaded member which pinions the hub to the mandrel, which itself has a threaded opening to accept the threaded member. The mandrel may be connected to support means such as a stand which raises the mandrel above the ground surface. A heat shield may be used to prevent heat radiating and conducting from the mandrel to the stand.

The invention also encompasses heating means for transferring heat to the mandrel. Said heating means may include at least one heating element, preferably a multiplicity of heating elements, which is capable of generating heat from a source of energy such as electrical power. The heating elements are also capable of transferring heat to the interior of the mandrel. Thus, heat is easily transferred through the mandrel and to the outer surface of the connected hub. The heating means may be controlled by a thermostat, relay, or other known heat controlling devices. The amount of heat generated by the mandrel may be also monitored by a thermal-couple or other remote temperature sensing device.

Second mounting means is also included in the present invention for holding a second open band and the first open band at a position on the hub. The second mounting means may be formed with pressing means for exerting a force radially inwardly on the open bands relative to the hub. Said pressing means may take the form of a rod extending from the body. The rod is capable of pinning at least a portion of the open bands to the external surface of the hub. Clamping means is also employed in the present invention for forcing the ends of the second open band together when positioned around the first open band and the hub. In this regard, the body may include a plate which possesses a plurality of apertures capable of accommodating the foot. Engaging means is also found in association with the plate for holding the rod within any of the apertures. Such holding means may take the form of forming the rod with a threaded surface and providing each of the plurality of apertures with a threaded wall.

It may be apparent that a novel and useful mechanism for heat bonding a mastic coated open band to a heat conductive hollow hub has been described.

It is therefore an object of the present invention to provide a bonding mechanism for bands employed on drums used in automatic transmissions for vehicles.

It is another object of the present invention to provide a mechanism for heat bonding open bands to hubs which use a heating element and a permanent mandrel which is employable with a number of different sized hubs.

A further object of the present invention is to provide a mechanism for bonding bands to a hub which includes a system of positively holding the band to the hub during the heating process.

The invention possesses other objects and advantages especially as concerns particular characteristics and features thereof which will become apparent as the specification continues.

For a better understanding of the invention, references made to the following Detailed Description of the Preferred Embodiments thereof which should be taken in conjunction with the prior described drawings.

DETAILED DESCRIPTION OF THE PREFERRED EMBODIMENTS

Various aspects of the present invention will evolve from the following Detailed Description of the Preferred Embodiments which should be taken with the drawings, prior described.

Figure 2A:
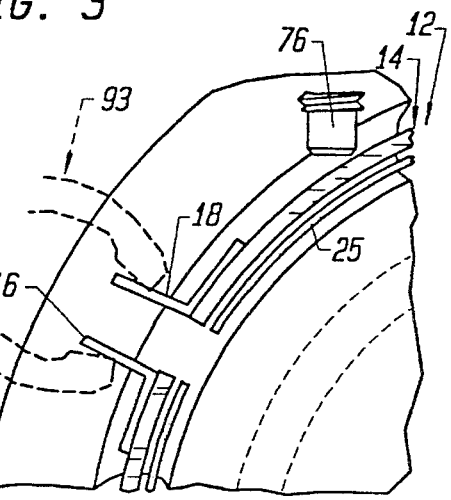
FIG. 2a is an enlarged portion of the clamping mechanism shown in FIG. 2.

The invention as a whole is depicted in the drawing by reference character 10. The mechanism 10 is employed for heat bonding a mastic coated open band such as band 12. Band 12 serves a liner for metal band 14 which terminates in angular clips 16 and 18, best shown in FIGS. 2 and 2a. Band liner (a first band) 12 and metal band (a second band) 14 are intended for being bonded to the outer surface 20 of hub or drum 22. Hub or drum 22 may be a portion of an automatic transmission for an automobile. Normally, hub 22 is made of metal and includes a central opening 24. Liner band 12 includes a mastic layer 25 which is capable of flowing under the application of heat and holding liner to surface 20 of drum 22 when cooled.

Figure 1:
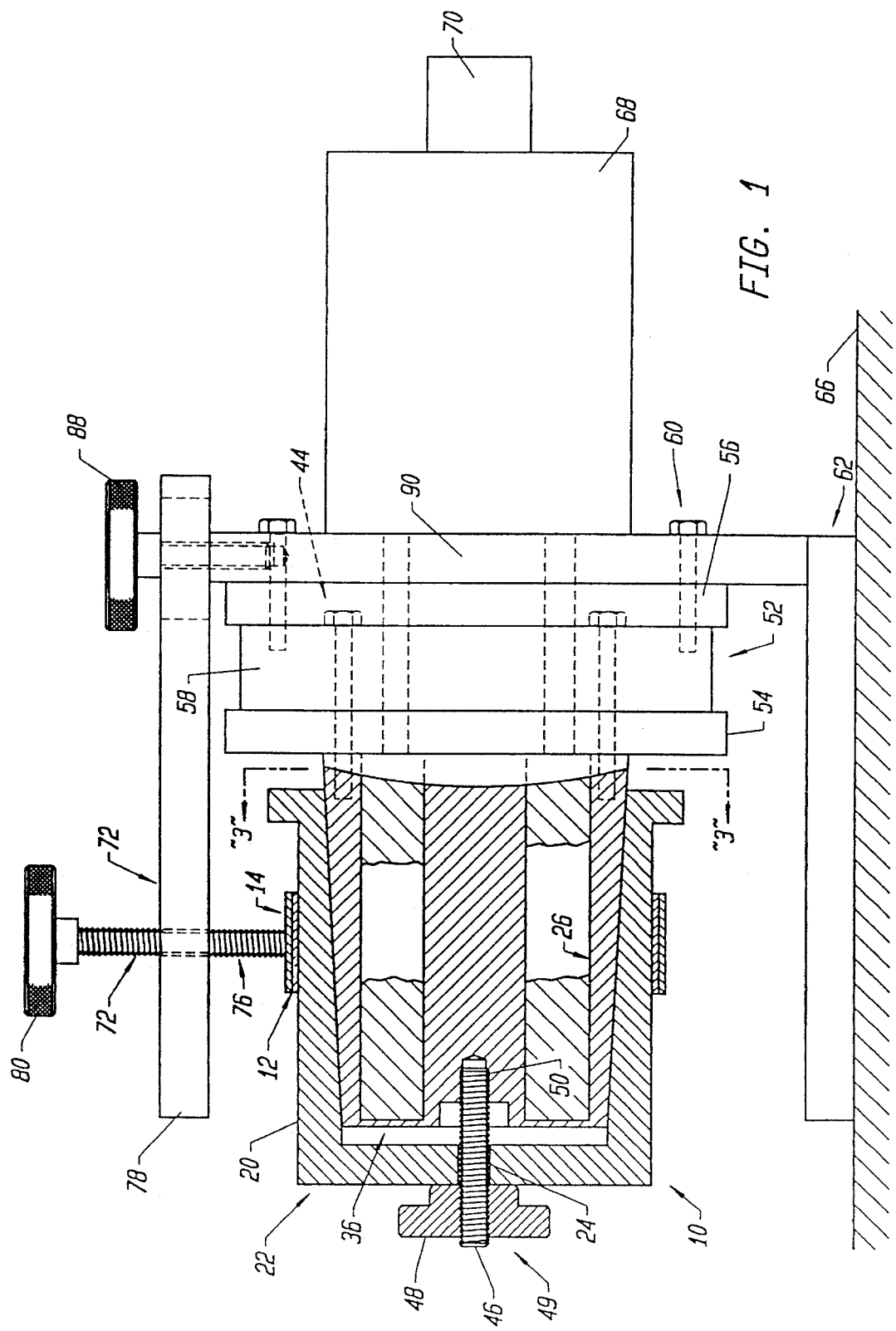
FIG. 1 is a side elevational view of the device with a portion of the hub supporting mandrel in section.
Figure 3:
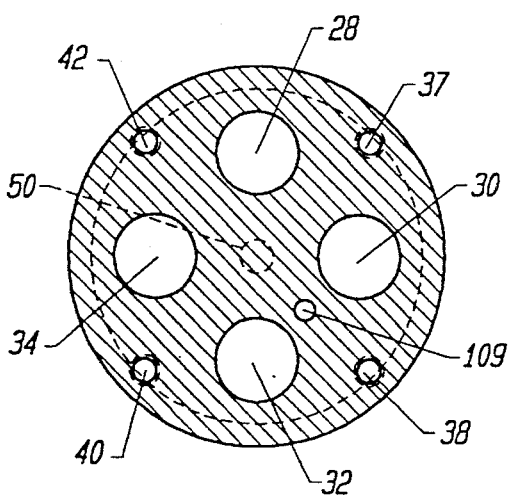
FIG. 3 is a sectional view taken along line 3—3 of FIG. 1.

Mandrel 26 is employed in the present invention to transfer heat to the metallic drum 22. With reference to FIG. 3, mandrel 26 is formed with openings 28, 30, 32 and 34 which accept heat producing elements such as plurality of heating elements 36, FIG. 1, shown as heating elements H1, H2, H3 and H4, on FIG. 5. In addition, openings 37, 38, 40 and 42 are threaded openings which accept threaded elements such as bolts 44, FIG. 1, the purpose of which will be discussed hereinafter. Central opening 24 permits the use of threaded bolt 46 and handle 48 to engage mandrel 26 at central opening 50. This constitutes first mounting means 49. Thus, hub 22 is removable and replaceable relative to mandrel 26.

Figure 4:
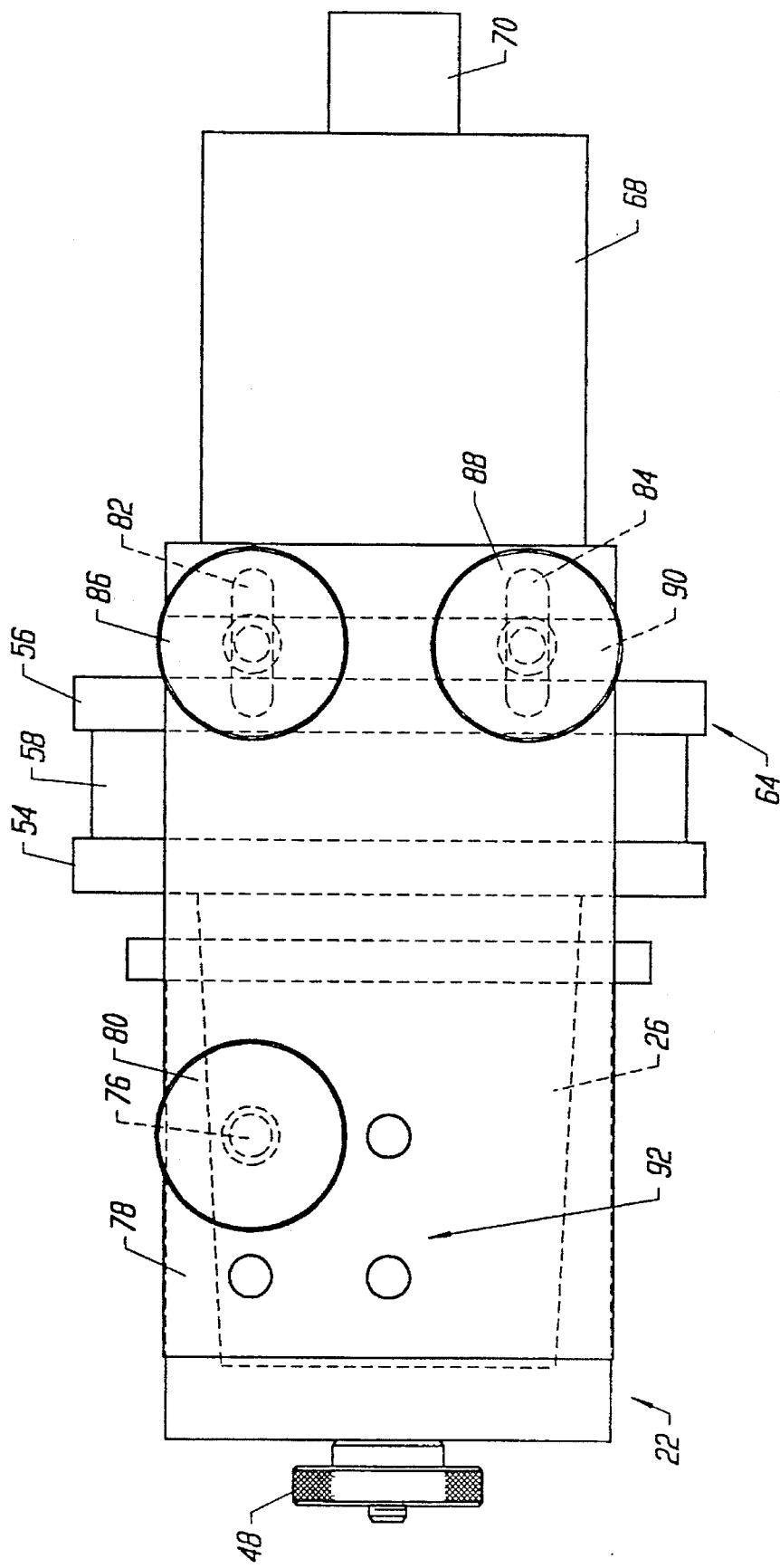
FIG. 4 is a top plan view of the mechanism of the present invention.

The device of the present invention also includes a heat shield 52 having a pair of metal plates 54 and 56 which sandwich an insulative plate 58, FIG. 4. Plurality of bolts 44 pass through plates 54 and 58 to hold mandrel 26 thereto. Likewise, plurality of bolts 60 hold plates 56 and 58 to stand 62. Thus, this arrangement serves as means for supporting mandrel 26 above ground surface 66. Housing 68 and conduit 70, FIG. 1, function to guide electrical wires and other components used with the operation of plurality of heating elements 36, which will be discussed hereinafter.

Figure 2:
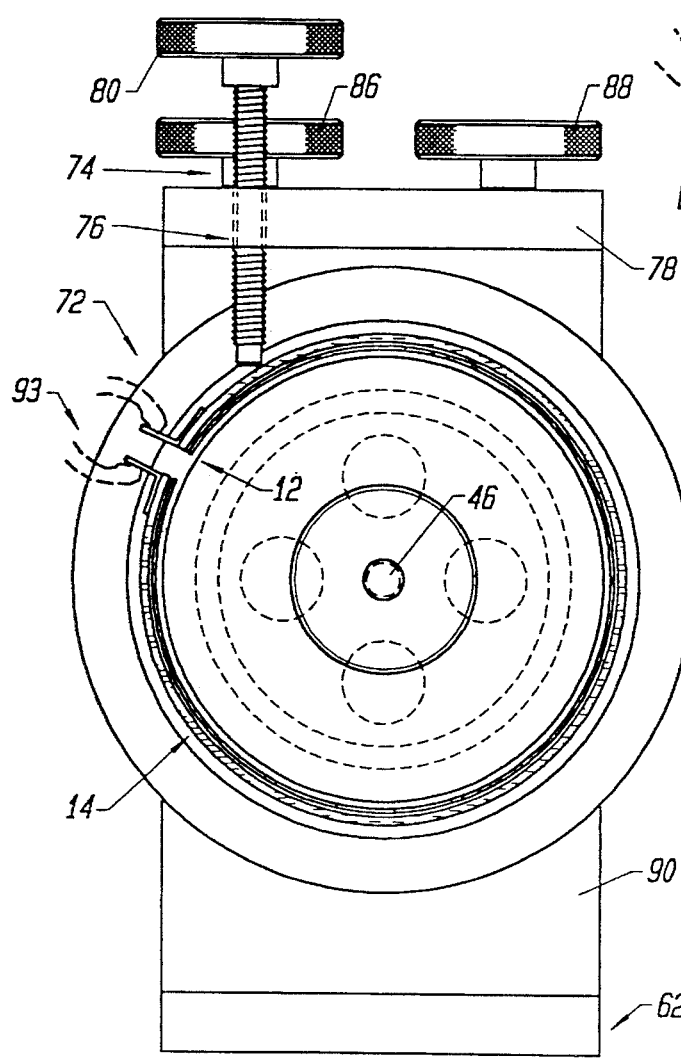
FIG. 2 is a front elevational view of the mechanism of the present invention.

Second mounting means 72 is also provided in the present invention for holding liner band 12 and metal band at a position on to the outer surface 20 of hub 22, FIG. 2. Second mounting means 72 also presses bands 12 and 14 to surface 20 of hub 22. Such pressing means would include a rod 76 in the form of a threaded member. Threaded member 76 extends through plate (body) 78 which lies a top stand 62. Hub 80 facilitates the travel of rod 76 inwardly and outwardly against bands 12 and 14, FIGS. 1 and 2. Plate 78 is moveable relative to mandrel 26 and includes a pair of slots 82 and 84 in this regard. Fasteners 86 and 88 threadingly engage the upright portion 90 of stand 62. Thus, rod 76 may be moved along surface 20 of hub 22 to hold bands 12 and 14 therealong. In addition, plurality of openings 92 in plate 78 permit rod 76 to extend downwardly to hub 22 to different positions, FIG. 4. Clamping means 93, FIG. 2, squeezes metal band 14 at tabs 16 and 18. Clamping means 93 may be a "c" clamp.

Figure 5:
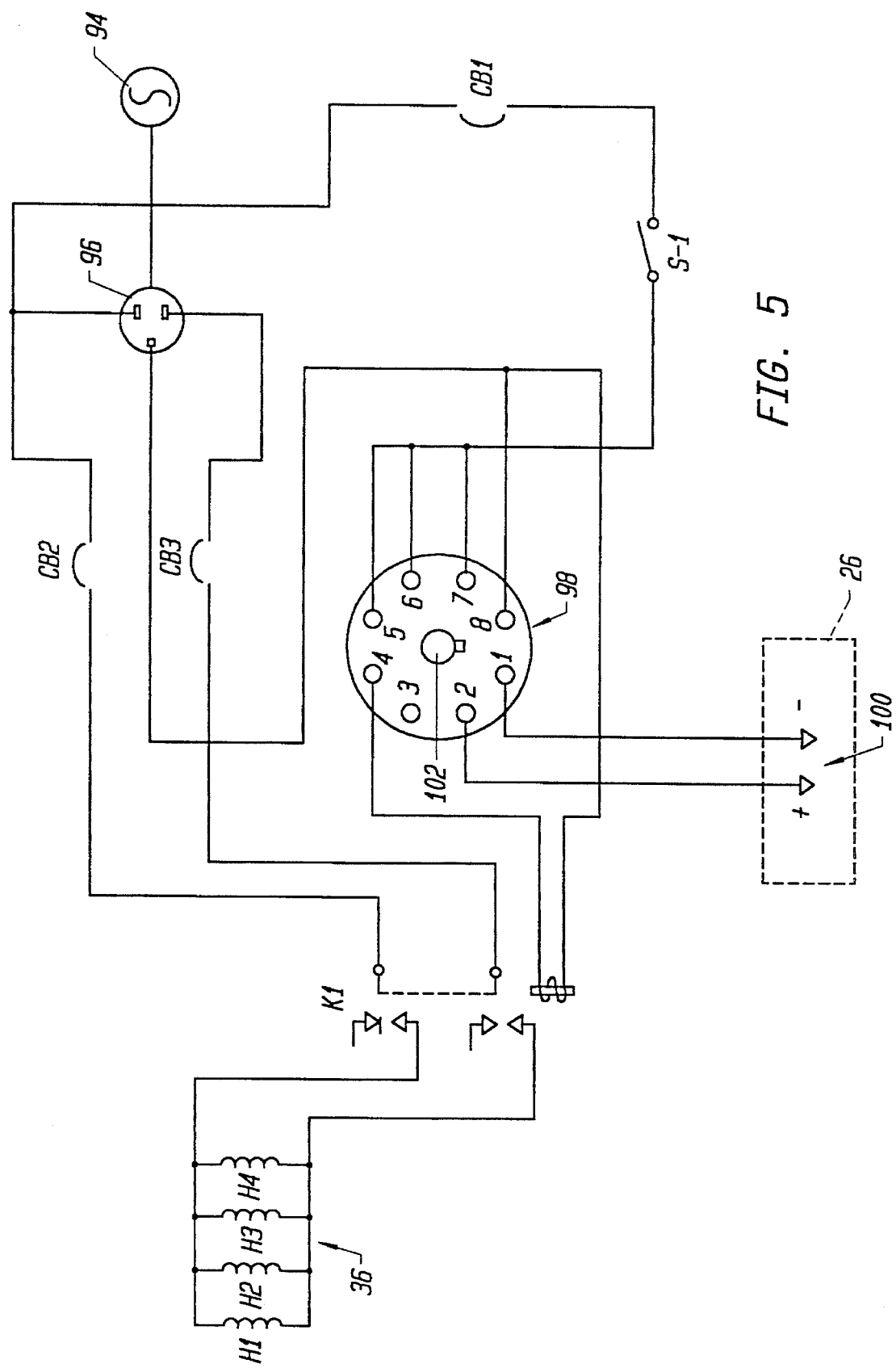
FIG. 5 is an electrical schematic showing the competing mechanism used in the mandrel of the present invention.

With reference to FIG. 5, a schematic drawing represents the electrical operation of plurality of heating elements 36 shown therein as H1, H2, H3 and H4.

Electrical power derives from electrical source 94 and is tapped through a connector 96 having three pins. Source of power, typically 220V AC, 1 phase electrical power, is normally centrally generated. Temperature controller 98 includes a thermal-couple that measures the temperature within mandrel 26. Switch S1 activates relay K1 such that heating elements H1, H2, H3 and H4 generate heat within mandrel 26. Temperature setting control 102 will receive temperature information from thermal couple 100 and deactivate relay K1 when the temperature exceeds a certain value at heating elements, H1, H2, H3 and H4. In this regard, opening 104 in mandrel 26 serves to house thermal-couple 100. Circuit breakers, CB1, CB2 and CB3 protect the circuits as shown in Fig. 5. Temperature controller 98 may be a model E5C4 manufactured by Omron.

In operation, the user fixes hub 22 to mandrel 26 using first mounting means 49. Bands 12 and 14 are placed around the outer surface 20 of hub 22 and held in position, radially and inwardly, by second mounting means 72, specifically rod 76. Clamping means 93 exerts a tension force on band 14. The position of rod 76 may be adjusted by moving plate 78 along slots 82 and 84 and by fastening the same with fasteners 86 and 88. Rod 76 may be placed in any one of the plurality of openings 92 through plate 78 to hold bands 12 and 14 at a desired position on surface 20 of hub 22. The user then connects power source 94 to mechanism 10 and operates switch S1 onto the "ON" position. Electrical power then passes to plurality of heating elements 36 through relay K1 and produces heat according to the temperature setting of temperature control 102. Heat then passes through mandrel 26 and hub 22 to outer surface 20 thereof. Mastic layer 25 on band 12 then melts. Upon cooling, band 12 is firmly held to hub 22 to serve as liner for metal band 14. Any excess temperature generated by heating elements 36 will be interrupted when detected by thermal-couple 100 by the use of central controller 98 through relay K1.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A mechanism for heat bonding a first open band which has a mastic coating to a heat conductive hollow hub, comprising:

a. a mandrel sized to fit within the heat conductive hollow hub, said mandrel being formed of heat conductive material;

b. heating means for transferring heat to said mandrel, said heating means including at least one heating element capable of generating heat from a source of energy and transferring said heat to said mandrel;

c. first mounting means for holding the heat conductive hollow hub on said mandrel;

d. second mounting means for holding a second open band and the first open band at a position on the hub, said second mounting means including a body and pressing means for exerting force radially inwardly on the open bands relative to the hub, said pressing means adjustably extending from said body and being capable of pinning at least a portion of the open bands to the hub; and e. clamping means for forcing ends of the second open band together when positioned around the first open band and the hub.

2. The mechanism of claim 1 further comprising support means for said mandrel.

3. The mechanism of claim 2 wherein said support means for said mandrel includes a heat shield.

4. The mechanism of claim 3 in which said body is connected to said support means for said mandrel.

5. The mechanism of claim 4 in which said support means for said mandrel includes a stand for supporting said mandrel above a ground surface.

6. The mechanism of claim 1 wherein said body is a plate possessing a plurality of apertures, said pressing means being capable of passing through any one of said plurality of apertures and contacting said second band.

7. The mechanism of claim 6 wherein each of said apertures has a threaded wall portion and said pressing means is a rod with a threaded portion capable of threadingly engaging any one of said threaded wall portions of said apertures.

8. The mechanism of claim 7 wherein said mandrel has a threaded aperture, and said first mounting means includes a threaded member capable of threadingly engaging said threaded aperture to hold the hub on said mandrel.

9. The mechanism of claim 4 in which said source of energy is an electrical source of energy.

10. The mechanism of claim 1 in which said heating means includes a plurality of heating elements located within said mandrel, and said plurality of heating elements being constructed of heat conductive material.

11. The mechanism of claim 6 in which said plate is movable relative to a support means for said mandrel.

* * * * *